United States Patent [19]

Young

[11] Patent Number: 5,092,380

[45] Date of Patent: Mar. 3, 1992

[54] METHOD OF CUTTING FRONDS OR FROND STUBS FROM A DATE PALM TREE

[76] Inventor: Darl E. Young, 82849 Lexington Ave., Indio, Calif. 92201

[21] Appl. No.: 676,260

[22] Filed: Mar. 27, 1991

Related U.S. Application Data

[63] Continuation-in-part of Ser. No. 562,913, Jul. 30, 1990, abandoned.

[51] Int. Cl.$^5$ .............................................. B27B 1/00
[52] U.S. Cl. .................................... 144/363; 30/353; 47/1.01; 144/2 Z; 144/208 C; 144/340; 144/343
[58] Field of Search ............... 30/353; 47/1.01; 294/2, 294/45, 54.5, 55; 144/2 Z, 208 C, 359, 363, 343, 340

[56] References Cited

U.S. PATENT DOCUMENTS 2,768,437 10/1956 Ronjan et al. .
2,813,278 11/1957 Stecher et al. .

OTHER PUBLICATIONS

An advertisement for trees from the May 1990 issue of "Plant Finder Magazine" published by Betrock Information Systems.
An advertisement for trees from the Jun. 1990 issue of "Plant Finder Magazine" published by Betrock Information Systems.
An advertisement for trees from the Jul. 1990 issue of "Plant Finder Magazine" pubished by Betrock Information System.
An advertisement for trees from the Feb. 1990 issue of "Plant Finder Magazine" published by Betrock Information System.
An advertisement for trees from the Mar. 1990 issue of "Plant Finder Magazine" published by Betrock Information Systems.
An advertisement for trees from the Apr. 1990 issue of "Plant Finder Magazine"published by Betrock Information Systems.
An advertisement for trees from the Sep. 1991 issued of "Southern Nurseryman's Digest" published by Betrock Information Systems.
An advertisement for trees from the Jul. 1991 issue of "Plant Finder Magazine" published by Betrock Information Systems.
An advertisement for trees from the Aug. 1991 issue of "Plant FInder Magazine" published by Betrock Information Systems.
An advertisement for trees from the Sep. 1991 issue of "Plant Finder Magazine" published by Betrock Information Systems.
An advertisement for trees from the Apr. 1991 issue of "Plant Finder Magazine" published by Betrock Information Systems.
An advertisement for trees from the May 1991 issue of "Plant Finder Magazine" published by Betrock Information Systems.
An advertisement for trees from the Jun. 1991 issued of "Plant Finder Magazine" published by Betrock Information Systems.
An advertisement for trees from the Feb. 1990 issue of "Southern Nurseryman's Digest" published by Betrock Information Systems.
An advertisement for trees from the Apr. 1990 issue of "Southern Nurseryman's Digest" published by Betrock Information Systems.
An advertisement for trees from the May 1990 issue of "Southern Nurseryman's Digest" published by Betrock Information Systems.
Article entitled Date Development, Handling, and Packing in the United States, Agricultural Handbook No. 482.
Article entitled, Growing Dates in the United States, by Roy W. Nixon and J. B. Carpenter.

*Primary Examiner*—W. Donald Bray
*Attorney, Agent, or Firm*—Christie, Parker & Hale

[57] ABSTRACT

A method of cutting fronds and frond stubs of a date palm tree is described using a sharp, curved cutting tool with a rounded cutting edge which enables an attractive tree bark surface to be created.

8 Claims, 5 Drawing Sheets

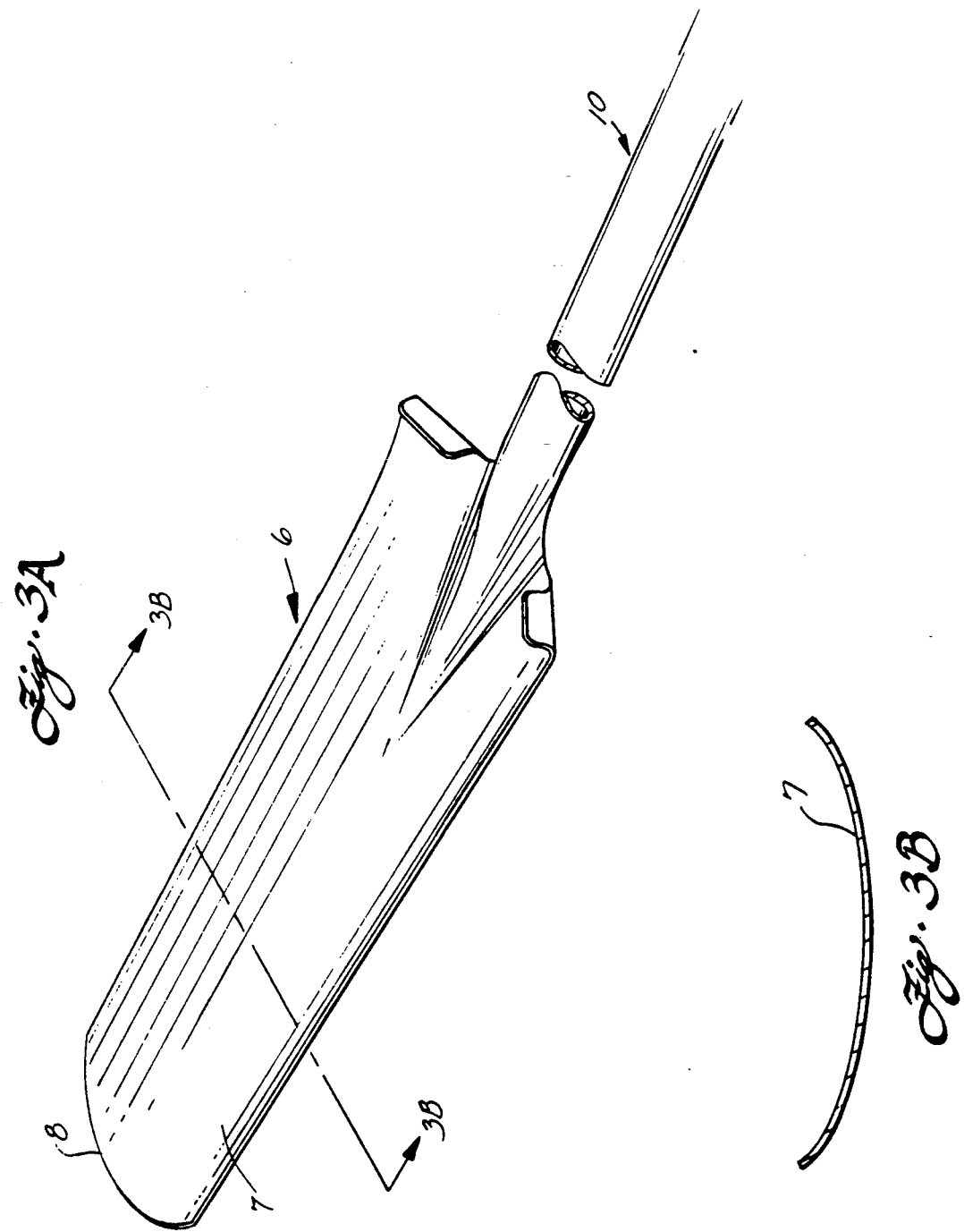

METHOD OF CUTTING FRONDS OR FROND STUBS FROM A DATE PALM TREE

CROSS REFERENCE TO RELATED APPLICATIONS

This application is a continuation-in-part of patent application Ser. No. 07/562,913, now abandoned filed July 30, 1990 and is related to design patent application Ser. No. 07/676,722 filed on the same data hereof.

BACKGROUND OF THE INVENTION

1. Field of the Invention Process

This process involves the cleaning and shaping of the trunk of a date palm tree to prepare it for transplanting; more specifically to properly protect and bring out the true natural beauty of this exotic desert tree.

2. Prior Art

Palm tree nurseries and landscapers dig around the root ball of a palm tree and gently lay the tree on the ground to prepare it for transplanting. The tree has many frond stubs (leaf stems) that have died and broken off. The rough, ragged look is not desirable.

For years the accepted procedure has been to use a chain saw to remove these old frond stubs. As the palm tree lay on the ground the operator would cut off these very wide stubs which often reaches 10" to 12" on a medium size tree with a trunk diameter of 18", many times cutting into the live wood of the tree's trunk and injuring the tree. The weight and power of the chain saw, as well as the odd positions that the saw has to be held in to remove the top, side and bottom stubs of the tree trunk by over cutting with the chain saw blade makes frond cutting difficult. Other landscapers have used circular saws, hand saws and bow saws with the same damaging result to the tree. Historically, this weakened the palm tree, and the resulting perpendicular cut to the tree trunk did not produce a natural looking weathered look. Even the name given this chain saw cut—"step cut"—implies an unnatural configuration. The very design of a flat saw blade makes nature's natural look difficult, if not to achieve impossible. These old procedures are still used today throughout the industry in the palm tree areas of the United States. For years a better tool or process was needed and sought after.

Spanish missionaries introduced the date palm tree into the Western hemisphere by planting date seeds around early missions. From this origin, the date palm, which is known botanically as "Phoenix Dactylifera L." has become a very important part of agricultural production in southwestern United States where a significant crop of date fruit is produced annually. Although date palm trees may be grown from seeds, primary production is by rooting offshoots that develop from axillary buds on the tree trunk, chiefly during the early years of the palm tree's life. Removal of the offshoots generally takes place after the tree has started to produce a second generation of offshoots. The size of the offshoots when ready for cutting generally varies from 40 to 100 pounds in weight and from 8 to 14 inches in diameter.

As a general rule, green leaves are not removed from an offshoot until it is cut from the parent palm tree unless the palm is crowded with offshoots. The leaves on the smaller offshoots are sometimes cut back close to the bud to retard growth. The cutting of an offshoot from the parent palm requires care and skill to avoid injury to either the offshoot or the host tree. A specially designed chisel with a rectangular cutting blade is generally used to cut the offshoot. The blade of the tool has one flat side and the other beveled so as to form three sharp cutting edges.

Another important use of the date palm tree in Southwestern United States has been as an ornamental. These trees which can grow quite tall generally obtain maximum leaf spread after 12 to 15 years of age. Frequently older palm trees retain more leaves than are needed either for fruit production or for an attractive appearance. As many as 180 green leaves have been counted on a single palm unpruned for six years. A considerable number of such leaves will be below the fruit bunches or will present a comparatively unattractive appearance where the tree is used for ornamental purposes. Furthermore, excess lower leaves may increase the relative humidity around the fruit bunches in mid summer, adversely affecting the fruit harvest. It also occurs that older leaves or fronds dry and die as the tree ages and may break off leaving unsightly stubs. This is especially undesirable where the tree is to be used for ornamental purposes. Dead or partly dead leaves may be removed at any convenient time but because of greater ease in cutting they are generally removed before becoming hard or drying.

In addition to the foregoing, it has also been recommended to remove the fronds of previous years growth to facilitate pollination and subsequent handling of fruit bunches. For this purpose, a sharp pruning knife with a long curved blade mounted on the handle is most frequently used. The curved blade is a planar surface resembling a curved end carpet cutting knife but of larger size. A cutting tool of this type used in the manner described simply results in a flat cut leaf edge.

As date palm trees become large and the fronds sturdy and strong, their removal is primarily accomplished by means of a chain saw. Although chain saw removal of fronds or stubs of fronds may be effective, it suffers from the disadvantages of leaving a frond stub cut surface which is unsightly and unattractive. Moreover, because of the toughness of the fronds, chain saw use requires frequent expensive replacement of the chain saw blades as they become dull or break.

The present invention provides a method of cutting date palm tree fronds or frond stubs which avoids the disadvantages of the techniques heretofore known and results in a date palm tree bark surface of unusually attractive appearance.

SUMMARY OF THE INVENTION

The principal object of my new process is to trim off the palm tree frond stubs with a sharp curved tool. This curved cutting tool allows us to adjust the trimming of these wide frond stubs to conform to large or small diameter trees, creating a rounded natural look. By using a rounded cutting tool, i.e., a cutting tool with a convex cutting edge, we are able to remove the frond stub with an upward cutting motion, e.g., at about a 45° angle, which gives us a true natural weathered look while at the same time not cutting into and damaging the palm tree's live wood.

In accordance with a preferred embodiment of the present invention there is provided a method of cutting fronds or stubs of fronds from a date palm tree to produce an attractive bark surface which comprises providing a cutting tool having a frontally disposed cutting means and a rearwardly extending support for the cutting means. The cutting means has a concave planar surface terminating in a convex cutting edge. The frond or frond stub is cut by engaging it with the cutting edge of the cutting means with sufficient force to cut at least a portion of the frond or stub. The engagement is repeated, as necessary, following the curvature of the tree, to completely sever the frond or frond stub without damaging the live wood of the palm tree. The cutting tool, during engagement with the frond stub, is oriented with the concave planar surface facing downwardly. This results in formation of an attractive curved face on the tree bark surface. Cutting the fronds or frond stubs around the curvature of the tree also results in a natural climbing spiral growth of attractive appearance. The process does not damage the main trunk of the tree under the outer bark and a healthy and beautiful tree results.

BRIEF DESCRIPTION OF THE DRAWINGS

FIGS. 3A and 3B are, respectively, a perspective view of the preferred cutting tool illustrating the concave planar surface of the cutting tool terminating in a convex cutting edge, and a cross section of the cutting tool showing the concavity of the planar surface;

FIGS. 7 and 8 are photographs of date palm trees showing the appearance of the bark surface after the frond stubs are cut by the prior method and in accordance with the invention, respectively.

DETAILED DESCRIPTION OF PREFERRED EMBODIMENT

Figure 1:
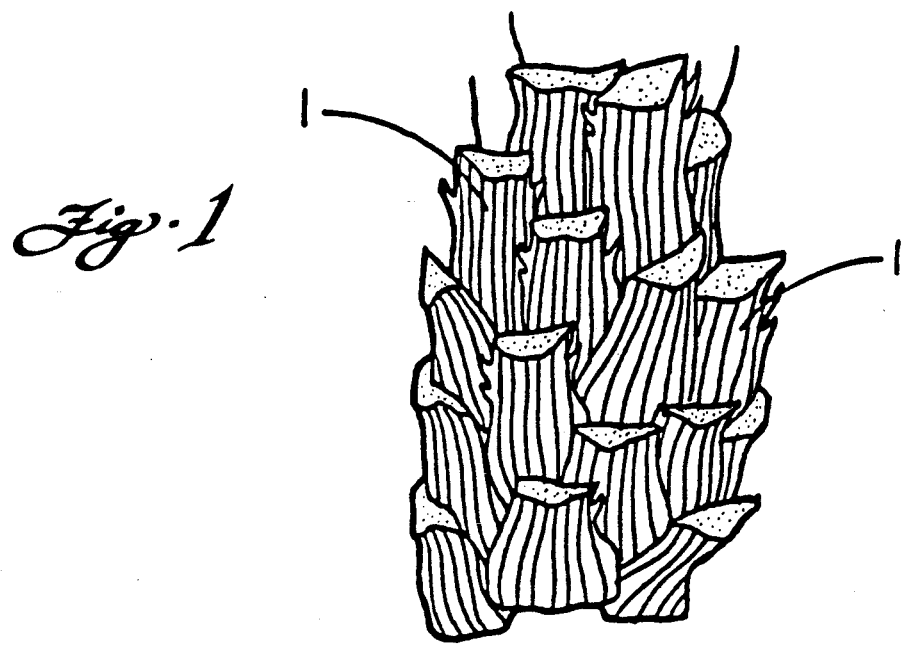
FIG. 1 is a schematic perspective view illustrating the bark appearance after the fronds have may have died and broken off by their weight and the wind.
Figure 2:
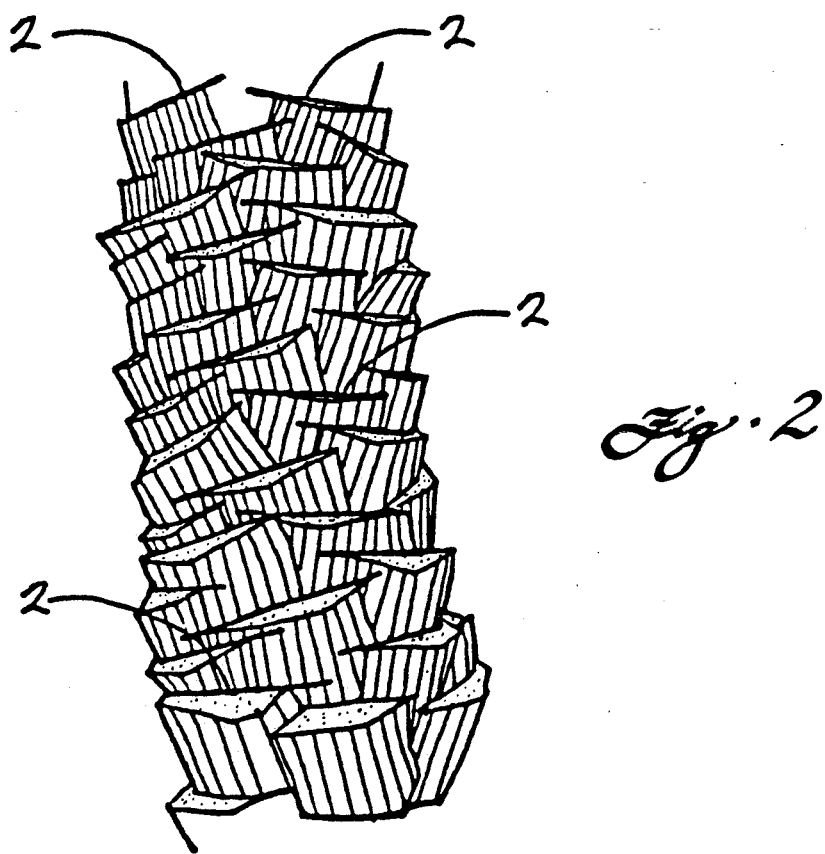
FIG. 2 is a schematic perspective view illustrating the bark appearance after the frond stubs are cut with a chain saw, the old chain saw or "step cut" that is currently in use today, (FIG. 2 displays the many possible cuts into the tree's live wood by the chain saw)
Figure 3:
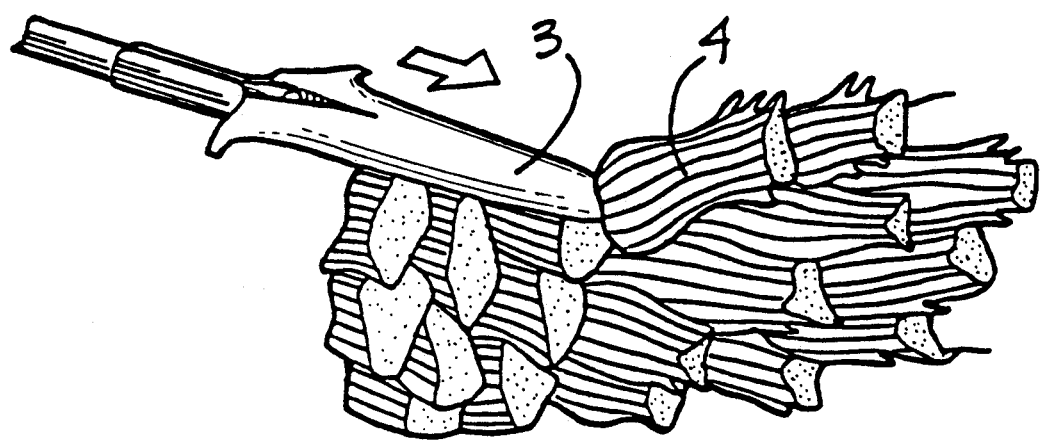
FIG. 3 is a schematic perspective view illustrating the removal of a frond stub with a sharp round cutting edge conforming to the shape of the tree.

The frond stubs of the date palm tree are most advantageously cut by removing the tree from the ground and laying it horizontally where it may be cleaned and prepared for shipment. A frond stub extends outward from the trunk of the tree bending upwards toward the top of the tree (FIG. 1). We proceed to cut and remove the stub, starting about four inches above the base of the stub where it joins the tree. We cut and remove the stub at an upwards angle of about 45° towards the top of the tree, following the curvature of the tree trunk (FIG. 3). The frond stub extends outwardly from the trunk of the tree bending towards the tree top. This can be seen in FIG. 1 where numeral 1 indicates the frond stubs of the tree bark surface. Prior to the present invention the frond stubs were cut using a chain saw with the results shown in FIG. 2 illustrating the flat unsightly cut surface 2 of the frond stub.

Using a tool 3 with a round cutting edge, as seen in FIG. 3, the frond stub 4 shown therein is cut at least about four inches above the base of the stub where it joins the tree. The stub is cut by engaging it with the cutting tool with sufficient force to cut at least a portion of the frond or frond stub by an upward motion, preferably at an upward angle of about 45° toward the top of the tree, following around the curvature of the tree trunk. The frond stub is engaged with the cutting tool as many times as necessary to completely sever the frond from the tree trunk. Using the technique described, the frond and frond stub is severed without any damage to the live wood of the palm tree such as generally occurs using chain saws.

A preferred cutting tool is shown in FIGS. 3A and 3B. As can be seen, the cutting tool comprises a cutting means 6 and a rearwardly extending support 10 therefor. The cutting means has a concave planar surface 7 terminating in a convex cutting edge 8.

Figure 4:
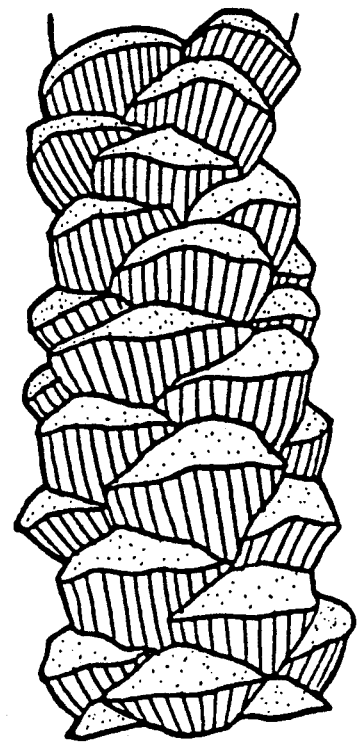
FIG. 4 is a schematic perspective view illustrating the tree bark surface after removal of the frond stub by the method of the invention and shows the completed tree displaying the upward spiral of this trees growth pattern without any damage to the tree's live wood.
Figure 5:
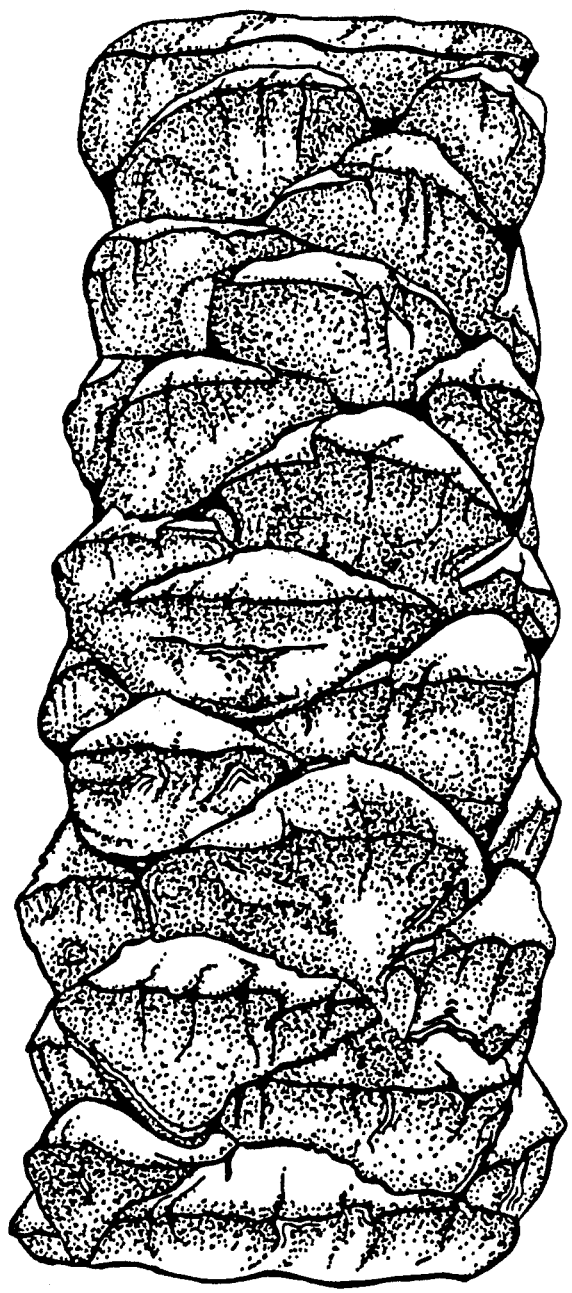
FIG. 5 is a perspective view of a segment of the tree trunk showing the attractive appearance made possible by practicing the invention and FIG. 6 is a perspective view of the whole tree.
Figure 6:
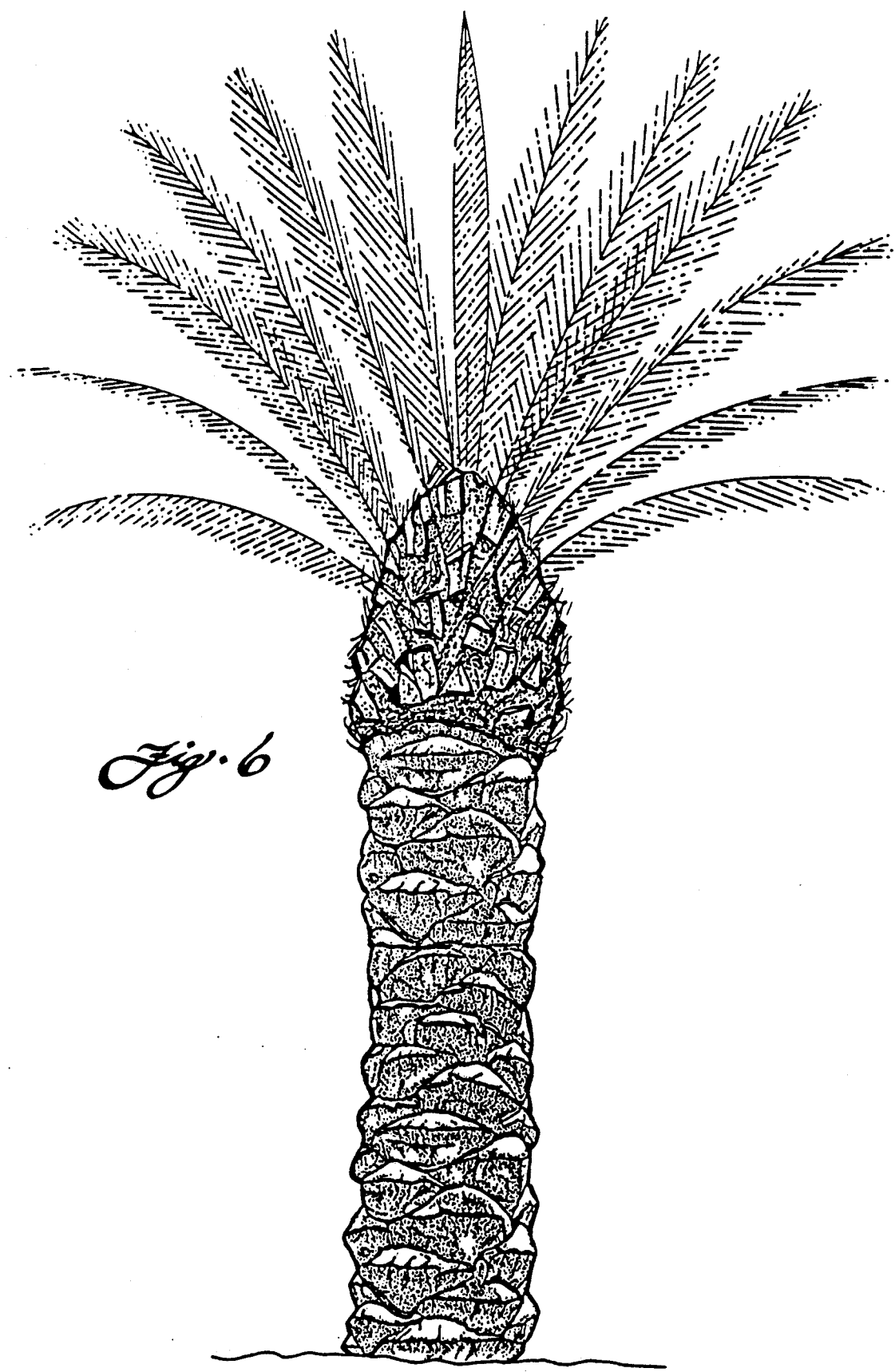

The tree bark appearance after cutting in accordance with the invention is shown schematically in FIG. 4, and as well as in FIGS. 5 and 6. As can be seen, practice of the method of the invention enables the palm tree's natural beauty to be brought out. The natural appearing climbing spiral growth of the date palm tree is shown beautifully and the tree becomes an attractive ornamental addition to the landscape.

The drawing of FIG. 2 shows the CHAIN SAW or "STEP CUT" debarking, or frond stub removal, traditionally used prior to the present invention to clean up palm trees when selling to a customer. The old system of some type of saw was used to cut the old stubs off. Because of the very wide frond base it is very easy to damage the living inner tree trunk. The smaller the tree, the more easily damage occurs because of the straight cut of the chain saw.

The appearance of the tree is only improved a little over the untrimmed portion of the tree by this chain saw trimming. For years this has been, and still is the standard of the industry.

Our round cutting tool allows us to reveal the natural beauty. Note that in both of the trees in the picture, the natural climbing spiral growth of this tropical tree is shown off very beautifully.

Further note that because of the curved cutting tool, as described, our new process does not damage the main trunk of the tree under the outer bark. A healthy and beautiful tree is the result of this new process.

It is apparent from the foregoing that various changes and modifications may be made without departing from the spirit of the invention.

Accordingly, the scope of the invention should be limited only by the appended claims wherein what is claimed is:

1. A method of cutting fronds or stubs of fronds from a date palm tree to produce an attractive bark surface comprising:
   providing a sharp curved rounded cutting tool having a frontally disposed cutting means and a rearwardly extending support therefor, said cutting tool having a sharp round cutting edge;
   engaging a frond to be cut with the sharp round cutting edge of said cutting tool with sufficient force to cut at least a portion of said frond and repeating said engagement as necessary, following the curvature of the tree, to completely sever the frond or frond stub without damaging the live wood of the palm tree.

2. A method according to claim 1 wherein said frond or frond stub to be cut is engaged by the cutting edge with an upwardly directed cutting motion.

3. A method according to claim 2 wherein said upward cutting motion is at an angle of about 45 degrees toward the top of the tree.

4. A method according to claim 3 wherein said frond or frond stub is engaged at about four inches above the base of the frond or frond stub where it joins the tree.

5. A method of cutting fronds or stubs of fronds from a date palm tree to produce an attractive bark surface comprising:
providing a cutting tool having a frontally disposed cutting means and a rearwardly extending support therefor, said cutting means having a concave planar surface terminating in a convex cutting edge;
engaging a frond to be cut with the cutting edge of said cutting means with sufficient force to cut at least a portion of said frond and repeating said engagement as necessary, following the curvature of the tree, to completely sever the frond or frond stub without damaging the live wood of the palm tree, said cutting tool being oriented with the concave planar surface facing downwardly during engagement with said frond.

6. A method according to claim 5 wherein said frond or frond stub to be cut is engaged by the cutting edge with an upwardly directed cutting motion.

7. A method according to claim 6 wherein said upward cutting motion is at an angle of about 45 degrees toward the top of the tree.

8. A method according to claim 7 wherein said frond or frond stub is engaged at about four inches above the base of the frond or frond stub where it joins the tree.

* * * * *

UNITED STATES PATENT AND TRADEMARK OFFICE
CERTIFICATE OF CORRECTION

PATENT NO. : 5,092,380

DATED : March 3, 1992

INVENTOR(S) : Darl E. Young

It is certified that error appears in the above-identified patent and that said Letters Patent is hereby corrected as shown below:

On the Title Page

[56] Refs. Cited, OTHER PUBLICATIONS, column 1, line 19, after "Sep. 1991" change "issued" to -- issue --.

Column 2, line 7, change "Plant FInder Magazine" to -- Plant Finder Magazine --.

Column 2, line 18, after "Jun. 1991" change "issued" to -- issue --.

Column 1, line 10, change "data" to -- date --.
Column 1, line 33, change "over cutting" to -- overcutting --.
Column 1, line 51, change "southwestern" to -- Southwestern --.

Column 2, line 6, after "ornamental" insert -- tree --.
Column 2, line 17, change "mid summer" to -- midsummer --.

Column 3, line 21, after "fronds" delete "have".
Column 3, line 26, after "today" delete the comma.
Column 3, line 39, change "trees" to -- tree's --.

UNITED STATES PATENT AND TRADEMARK OFFICE
CERTIFICATE OF CORRECTION

PATENT NO. : 5,092,380

DATED : March 3, 1992

INVENTOR(S) : Darl E. Young

It is certified that error appears in the above-identified patent and that said Letters Patent is hereby corrected as shown below:

Column 3, delete lines 45 through 48 as follows:

"FIGS. 7 and 8 are photographs of
date palm trees showing the
appearance of the bark surface
after the frond stubs are cut by
the prior method and in accordance
with the invention, respectively."

Column 4, line 18, change "therefor" to -- therefore --.

Column 4, line 60, change "therefor" to -- therefore --.

Signed and Sealed this

Twenty-eighth Day of September, 1993

*Attest:*

BRUCE LEHMAN

*Attesting Officer*    *Commissioner of Patents and Trademarks*